United States Patent [19]
Possell

[11] 3,719,836
[45] March 6, 1973

[54] PRESSURE SENSITIVE SENSOR AND CONTROL UNIT AND METHOD OF USING SAME

[76] Inventor: Clarence R. Possell, 4842 Viane Way, San Diego, Calif. 92110

[22] Filed: June 23, 1971

[21] Appl. No.: 155,878

[52] U.S. Cl. ............307/308, 307/252 J, 307/252 W, 307/301, 331/65, 331/111
[51] Int. Cl. .............................................H03k 3/335
[58] Field of Search ......307/252 J, 252 W, 301, 308; 315/340; 328/1; 331/65, 111

[56] References Cited

UNITED STATES PATENTS 3,275,926   9/1966   Shehenn..........................307/301 X Primary Examiner—John Zazworsky
Attorney—William C. Babcock

[57] ABSTRACT

An electrical circuit for energizing a load and continuing to supply current to said load so long as a sensor forming a part of said circuit is subjected to a particular physical condition that permits said sensor to impress a voltage of a predetermined magnitude on the gate of a controlled rectifier. The flow of current from said rectifier to said load is further controlled by a transistor, the base of which is subjected to a pulsating current, with said transistor being conductive only during one of said pulses. The current flow to said load is terminated within the time interval between two of said pulses when said impressed voltage of said gate falls below said predetermined magnitude. The switching function of the circuit consequently has a small deadband.

5 Claims, 5 Drawing Figures

PATENTED MAR 6 1973 3,719,836
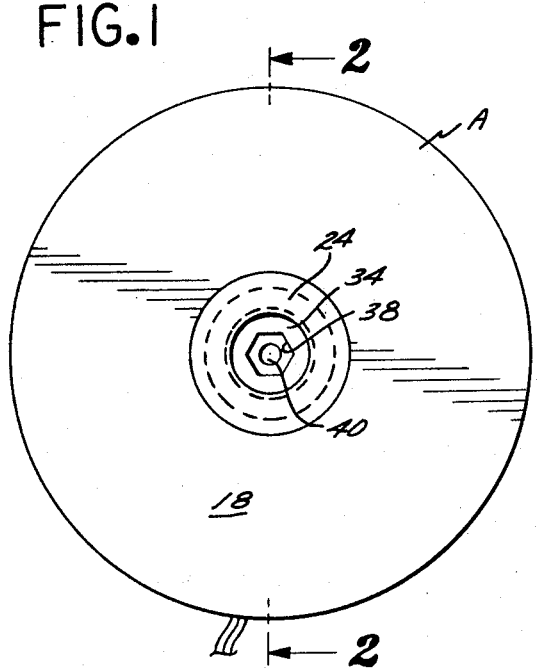
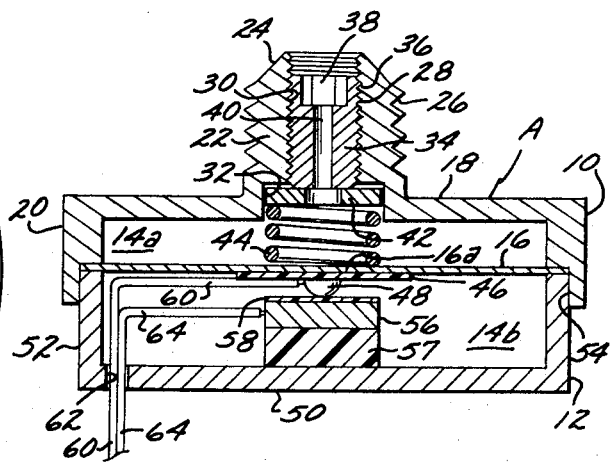
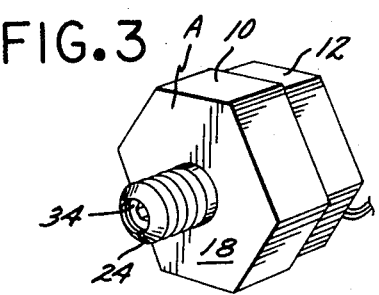
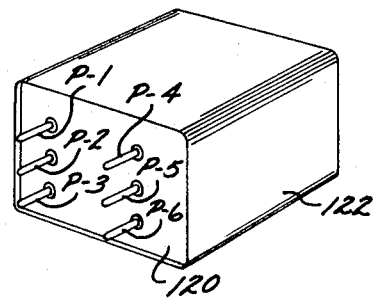
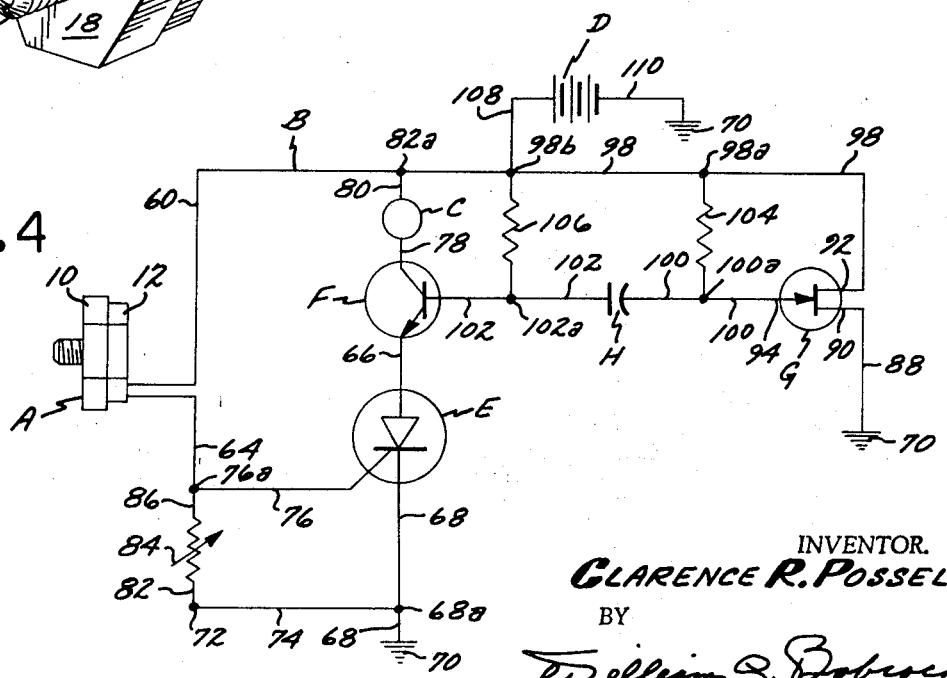
INVENTOR.
CLARENCE R. POSSELL
BY
William G. Babroch
ATTORNEY

PRESSURE SENSITIVE SENSOR AND CONTROL UNIT AND METHOD OF USING SAME

BACKGROUND OF THE INVENTION

1. Field of the Invention

Pressure sensitive sensor and control unit and method of using same.

2. Description of the Prior Art

Although a number of switch mechanisms have been developed and used in the past to complete circuits to various types of electrically-operated components when a pressure of predetermined magnitude is exceeded, heretofore these devices have, in the main, included moving parts, and as a result thereof have been found unsatisfactory in those environments in which these mechanisms have been subjected to substantial vibration and shock.

Furthermore, such previously available switch mechanisms have included contact points that are subject to deterioration caused by arcing and oxidation, that adversely affect the reliability thereof.

A primary purpose in devising the present invention is to supply a sensor and control unit and method of using same that is substantially free of the operational disadvantages of prior art devices of this type.

SUMMARY OF THE INVENTION

An electrical circuit for energizing a load and continuing to supply current to said load so long as a sensor forming a part of said circuit is subjected to a particular physical condition that permits said sensor to impress a voltage of a predetermined magnitude on the gate of a controlled rectifier. The flow of current from said rectifier to said load is further controlled by a transistor, the base of which is subjected to a pulsating current, with said transistor being conductive only during one of said pulses. The current flow to said load is terminated within the time internal between two of said pulses when said impressed voltage of said gate falls below said predetermined magnitude. The switching function of the circuit consequently has a small deadband.

A major object of the present invention is to provide a small, lightweight, pressure sensitive sensor, and control unit for use therewith, which are free of moving parts, and include no contacts that may arc or chatter during use of the sensor and unit, which may be used over an extremely wide range of pressures and environmental conditions.

A still further object of the invention is to provide a pressure sensitive sensor that is capable of carrying relatively heavy electrical currents, and hence requires no amplifier.

Another object of the invention is to supply a pressure sensitive sensor and associated control unit that may be easily and quickly pre-set at the time of manufacture to actuate the control unit at any decided pressure within a predetermined range which is of simple mechanical structure, is compact and light in weight, will operate satisfactorily over a prolonged period of time within a wide temperature range, can be fabricated from standard, commercially available materials, requires no elaborate plant facilities for the production thereof, and due to the lack of moving parts requires little or no maintenance attention.

Yet another object of the invention is to provide a pressure sensitive sensor that can be used separately and apart from a control unit to provide an inexpensive on-off switch in installations wherein sharp, on-off times are not required.

A further object of the invention is to furnish a control unit, which in conjunction with the sensor will actuate a load within a predetermined period of time when the pressure for which the sensor is calibrated is exceeded.

BRIEF DESCRIPTION OF THE DRAWINGS

FIG. 1 is a top plan view of a fluid actuated pressure sensitive sensor;

FIG. 2 is a longitudinal cross-sectional view of the sensor shown in FIG. 1, taken on the line 2—2 thereof;

FIG. 3 is a front perspective view of the pressure sensitive sensor shown in FIGS. 1 and 2;

FIG. 4 is a diagrammatic view of the pressure sensitive sensor in combination with a control unit; and FIG. 5 is a front perspective view of the control unit.

DESCRIPTION OF THE PREFERRED EMBODIMENT

The general arrangement of the invention as will be seen in FIGS. 1–3 includes a fluid actuated pressure sensitive sensor A, and a control unit B therefor illustrated in FIGS. 4 and 5. The sensor A includes as a part thereof, a unique element to be described later herein, embodying an electrical resistance which varies in proportion to the force impressed thereon, which force is provided by the pressure exerted on the fluid to which the sensor A is responsive.

Control unit B provides an electrical current to excite the sensor A, and the sensor in turn, generates a voltage that is proportional to the pressure exerted on the actuating fluid. When the pressure on the actuating fluid reaches a predetermined magnitude, the voltage supplied to the control unit B is of such value as to render a first portion thereof conductive. A second portion of the control unit B is intermittently conductive and non-conductive, and is adapted to receive electrical current from the first portion thereof prior to delivery of the same to the load being energized, whereby a load being energized is supplied with a pulsating direct current.

A frequency of three hundred pulses per second has been found to be satisfactory in the majority of installations. However, the frequency of the pulses may be either increased or decreased by relatively simple changes in the components comprising the control unit B.

In the event of a decrease in the pressure of the actuating fluid below said predetermined magnitude, the voltage supplied to the first portion of the control unit B is insufficient to trigger it into a conductive condition. However, said first portion of control unit B has the characteristic of remaining conductive after the triggering voltage is removed. Thus, the load would remain electrically energized after the pressure exerted on the actuating fluid had fallen below said predetermined magnitude, were it not for the second portion of the control unit B.

The load, and the first and second portions of control unit B are in series. Within a desired period of time, micro-seconds, after the triggering, current to the first portion of unit B falls below the triggering voltage and momentarily the second portion of this unit becomes non-conductive. The series circuit to the load is then broken and is not renewed on the next cycle in which the second portion of control unit B becomes conductive, for the triggering electrical current to the first portion thereof is below the voltage at which said first portion becomes conductive. Thereafter the load is de-energized, and will not be electrically energized until the pressure on the actuating fluid rises above a predetermined magnitude to permit the above described cycle to be repeated.

The pressure sensitive sensor A illustrated in FIGS. 1, 2, and 3, includes a first cup 10 that is engaged by a second cup 12 which cooperatively provide a hollow housing. The junction of cups 10 and 12 serves to support a resilient diaphragm 16, as may best be seen in FIG. 2.

The first cup 10 comprises a plate 18 having a continuous side wall 20 that extends downwardly from the peripheral edge thereof. A cylindrical boss 22 projects from the center of plate 18, and is preferably provided with an upwardly and inwardly tapering free end section 24. Threads 26 are formed on the external surface of the boss 22, and a bore 28 extends throughout the length thereon, on the surface of which threads 30 are defined. The junction of boss 22 and plate 18 defines an upwardly extending cylindrical recess 32 which is in communication with bore 28.

A plug 34 on the external surface of which threads 36 are formed, is rotatably mounted in the bore 28. When plug 34 is rotated, the threads 36 move relative to threads 26 whereby the plug is raised or lowered to a desired degree relative to boss 22. A cavity 38 of non-circular transverse cross section is formed in the upper portion of boss 22, and this cavity is in communication with a bore 40 extending longitudinally through the central portion of the plug 24. By use of a tool (not shown) adapted to engage cavity 38, the plug 34 can be rotated to a desired degree relative to boss 22.

The lower end of the plug 34 abuts against the upper surface of a washer 42 (FIG. 2) that is slidably mounted in recess 32. The lower surface of washer 42 is in abutting contact with the upper end of a helical spring 44, the lower end of which rests on the upper central surface 16a of the diaphragm 16. A reinforcing member 46 formed from a stiff, electrical insulating material is mounted on the lower central portion of the diaphragm 16, as shown in FIG. 2, directly below the central surface 16a thereof. Member 46 is preferably larger in diameter than the external diameter of spring 44.

A pressure member 48 fabricated from a hard, electrical-conducting material and preferably hemispherical in configuration, is bonded to the lower central surface of reinforcing member 46. The second cup 12, also shown in FIG. 2, includes a circular plate 50, and a cylindrical side wall 52 which extends upwardly from the peripheral edge thereof. The upper portion of the side wall 52 is disposed within a ring-shaped recess 54 defined in the lower interior of side wall 20. The peripheral edge portion of diaphragm 16 is sandwiched between adjacent parts of the side walls 20 and 52, as shown in FIG. 2. The first and second cups 10 and 12 are held in fixed engagement to support the diaphragm 16 by thread means, bonding, or other conventional means.

The upper central portion of plate 50 supports a base 57 formed of a rigid electrical insulating material, as may be seen in FIG. 2. Base 56 serves to support a block 56 formed from a rigid, electrical conducting material. A film of material 58 is applied to the upper surface of block 56. Film 58 which comprises a mixture of a resin that polymerizes when exposed to the ambient atmosphere, a thinner, and lanthanum carbonate (lanthanite) and zirconium tetrachloride is preferably applied in liquid form to the upper surface of block 58, and then permitted to dry.

When no pressure is exerted thereon, the film 58 has infinite electrical resistance. However, as pressure is applied to film 58, the resistance thereof drastically decreases. For instance, film 58 may have a resistance of hundreds of thousands of ohms when no force is exerted thereon, and a resistance of one hundred ohms, or less, when a predetermined force is applied thereto. One end of the conducting portion of a first insulated electrical conductor 60 is connected to an upper part of the pressure member 48 adjacent reinforcing member 46, as best shown in FIG. 2. Conductor 60 extends through an opening 62 formed in the plate 50. A second conducting portion of an insulated electrical conductor 64 is connected to the metal block 56, and also projects through an opening 62.

The use and operation of the pressure sensitive sensor A are relatively simple. In FIG. 2 it will be seen that the diaphragm 16 subdivides the confined space defined by cups 10 and 12 into an upper compartment 14a and lower compartment 14b. The pressure on fluid in compartment 14a, which will cause the diaphragm 16 and pressure member 48 to exert a full load of predetermined force on film 58, is dependent on a number of variables. These variables include the force exerted by spring 44 on diaphragm 16, the area of pressure member 48 in contact with film 58, as well as the diameter and thickness of the diaphragm and the degree of resiliency of the material from which the diaphragm is fabricated. By proper correlation of these variables, a sensor A may be provided that will operate within discrete pressure ranges such as 0.1 to 3; 3 to 10; 10 to 25; 25 to 100; 100 to 500; 500 to 1,000; 1,000 to 3,000; and 3,000 to 20,000 p.s.i.

Should it be desired to cause the sensor A to complete a circuit between a source of electrical power and a load to be electrically energized when fluid in compartment 14a is under a pressure of 7 p.s.i., a sensor with a range of 3 to 10 p.s.i. would be used. Plug 34 would then be rotated in boss 22 to move downwardly therein and partially compress spring 44. The degree of compression of spring 44 is sufficient to exert a force on diaphragm 16 such that when fluid is at 7 p.s.i. in compartment 14a, the full load exerted will be exerted on film 48.

When the sensor A is so used, the conductors 60 and 64 and other conductors (not shown) connect the sensor in series with an electrical power source and the load to be electrically energized. Fluid in the compartment 14a is delivered thereto through a conventional conduit (not shown) provided with a conventional fitting (not shown) that engages the threads 26 formed on boss 22. The above described application of sensor A is limited to those situations where sharp on-off times are not required.

When it is desired to electrically energize a load C, such as a light, relay, or the like, in less than a few milliseconds and the pressure on the actuating fluid rises to a predetermined level, the sensor A is combined with the control unit B illustrated in FIGS. 4 and 5. The load C is de-energized in less than a few milliseconds when the sensor A and control unit B are used in combination (FIG. 4) and the pressure on the actuating fluid drops below a predetermined level.

The control unit B may take various forms, but one form thereof which has been successfully commercialized is shown in FIG. 4. The unit B, in combination with the sensor A (FIG. 3), has under actual tests been found to be operative after ten million switching operations. In environmental tests the control unit and sensor A have been found to be operative after being subjected to random vibrations of 2 to 2,000 hertz to 65 g's, and sinusoidal oscillations of 2 to 2,000 hertz up to 100 g's. Sensor A and control unit B have also successfully survived the shock of 1,000 g's. In addition, during tests the sensor A and control unit B have been found to be operative within a temperature range of from −65° to +165° C.

The dimensions of the commercially available sensor A shown in FIG. 3 are ¼ × ½ × 1 ½ inches, while the control unit B illustrated in FIG. 5 is 1 × 1 × ¾ inches in size. The source of power used to excite the sensor A and energize the load C when a predetermined pressure is exerted on the actuating fluid, is preferably a battery D that supplies 28 volts.

The unit B includes a silicon controlled rectifier E that is commercially identified by the notation 2N2323 and as conventional with such a device includes cathode, anode and gate terminals. A transistor F also forms a part of unit B, which transistor is identified by the notation 2N697. The transistor includes emitter, base and collector terminals. The unit B includes a unijunction transistor G that has first and second base terminals 90 and 92 and a third terminal 94. A capacitor H is also included as a part of the unit B, as is a potentiometer 84.

The conductors 60 and 64 as may be seen in FIG. 4 are connected to junction points 98b and 76a respectively. An electrical conductor 66 connects the emitter of transistor F to the anode of controlled rectifier E. The cathode of rectifier E has an electrical conductor 68 extending therefrom to ground 70. An electrical conductor 74 extends from junction point 68a in conductor 68 to a junction point 72, which last mentioned junction point is connected by an electrical conductor 82 to potentiometer 84. The gate of rectifier E has an electrical conductor 76 that extends therefrom to the junction point 76a to which the conductor 64 is connected. Potentiometer 84 is connected to junction point 76a by an electrical conductor 86. Conductor 60 has a junction point 82a therein that is connected by an electrical conductor 80 to a terminal of load C. The opposite terminal of load C is connected by an electrical conductor 78 to the collector of transistor F.

The first base terminal 90 of unijunction transistor G is connected by a conductor 88 to a ground 70. The second base terminal of unijunction transistor has an electrical conductor 98 extending therefrom to a junction point 98b. The base of transistor F and the third terminal of unijunction transistor G are connected to electrical conductors 102 and 100 that extend to The unijunction G, as is common to such devices, has a high resistance of between 5,000 and 10,000 ohms between the base terminals 90 and 92, known as the interbase resistance. In the absence of an electric current on emitter 94, the unijunction G acts as a voltage divider, with a fraction of the positive voltage on second base terminal 92 appearing at emitter 94. As long as the emitter voltage is less positive than this fraction, only a small emitter leakage current flows. When the positive voltage on the emitter 94 becomes greater than this fraction of the second base terminal voltage at the emitter 94 due to the charging of capacitor H, an emitter current will flow to discharge the capacitor H. The charge and discharge of the capacitor H results in pulses of direct current being impressed on the base of transistor F. The magnitude of the resistors 104 and 106 cooperate with capacitor H to determine the frequency of the pulses of current impressed on the base of transistor F. The capacitor H tends to continuously charge due to the left hand side thereof, as viewed in FIG. 4, being connected to the positive side of battery D by a circuit that includes resistance 106. As the capacitor H charges an increasing voltage is built up on emitter 94 and base of transistor F. When this voltage has increased to a first magnitude, transistor F becomes conductive to permit load C to be energized. As the charge on capacitor H continues to build up beyond said first magnitude, a voltage is exerted on emitter 94 that is greater than the voltage thereon from the second base 92, whereupon unijunction G becomes conductive and allows capacitor G to discharge to ground 70 through conductor 88.

The voltage on the base of transistor F now drops below said first magnitude and the energization of load C is now terminated. After the capacitor H has discharged through unijunction G the unijunction becomes non-conductive. The capacitor H now starts to charge again and the above described cycle is repeated.

Electric current can flow from the cathode to the anode of rectifier E only when voltage of a predetermined magnitude is impressed on the gate of the rectifier. When the pressure on unit A increases to a predetermined magnitude, the resistance of the unit decreases to the extent that a voltage of triggering magnitude is impressed on the gate of rectifier E, which results in the rectifier now being conductive between the cathode and anode thereof. However, electric power can flow from rectifier E through transistor F to load C only during the time intervals the base of the transistor has a pulse of current impressed thereon. As a result, the electric power supplied to load C is of the pulsating type.

Upon the pressure on unit A dropping below a predetermined magnitude, the resistance of the unit becomes so great that the voltage on the gate of rectifier E is not sufficient to trigger the same.

However, once the rectifier E is triggered, it does not require a triggering voltage on the gate thereof to maintain the rectifier conductive. Thus, were it not for the transistor F, the load C would continue to be energized after the pressure on the unit A had dropped below a predetermined magnitude. Thus, to terminate the flow of electric power to the load C after the pressure on unit A has dropped below a predetermined magnitude flow of electric power through the rectifier must cease. After flow of electric power through rectifier E has ceased, such flow can thereafter be initiated only by imposing a triggering voltage on the gate of the rectifier. Transistor F only permits intermittent flow of pulses of spaced electric power therethrough, and serves to break the flow of electric power through rectifier E to load C in the first time interval between pulses after the voltage to the gate of rectifier E has dropped below a triggering magnitude. The terminators of energization of load C accordingly terminates but a short time after the pressure on unit A drops below a predetermined magnitude.

To withstand severe shock and changes in environmental conditions, the components and wiring comprising the control unit B are preferably mounted on a base 120 formed from a stiff electrical insulating material (FIG. 5). The base 120 has six parallel, spaced electrical conducting prongs P-1 to P-6 extending therefrom. An inverted cup-shaped housing 122 is affixed to the periphery of base 120 and houses the components and wiring comprising the control unit B. Prongs P-1 and P-2 are connected to conductors 74 and 76 respectively, and receive the input signal from the sensor A. Prongs P-3 and P-4 are connected to conductors 108 and 110 respectively, to receive the 28 volt power from battery D, or other suitable source. Prongs P-5 and P-6 are connected to conductors 78 and 80 respectively, and supply pulsating electric power to the load C. The power so supplied to load C will pulsate at a frequency of 300 times, or greater, per second. The rate of pulsation is controlled by the characteristics of capacitor H and resistors 104 and 106. The prongs P-1 and P-6 removably engage openings provided in a conventional plug, not shown. By this arrangement, the sensor A and control unit B may be spaced at any desired distance relative to one another.

Both the sensor A and control unit B have a wide range of operation, and are particularly adapted for use as pressure or liquid level detectors in aircraft and missiles.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:

1. A variable resistance operated load energizing circuit that includes:
   a. a direct current source having positive and negative terminals;
   b. a controlled rectifier that has a cathode, anode and gate;
   c. a transistor that has a base, collector and emitter;
   d. a unijunction transistor that has first and second base terminals and an emitter;
   e. a capacitor;
   f. variable resistance sensing means in which the resistance varies in proportion to a change in a physical variable to which said sensing means is subjected, said sensing means including first and second terminals;
   g. an electrically operated load having first and second terminals;
   h. first electrical conducting means connecting said positive terminal of said direct current source, and said first terminal of said sensing means;
   i. second electrical conducting means connecting said positive terminal of said direct current source to said second terminal of said load, and said second base terminal of said unijunction transistor;
   j. third electrical conducting means connecting said first terminal of said load to said collector of said transistor, said emitter of said transistor to said anode of said controlled rectifier and said cathode of said controlled rectifier to said negative terminal;
   k. fourth electrical conducting means connecting said base of said transistor and said emitter of said unijunction transistor to said capacitor;
   e. fifth electrical conducting means connecting said first base terminal of said unijunction transistor to said negative terminal;
   m. sixth electrical conducting means including a first resistance element connecting said first electrical conducting means to a portion of said fourth electrical conducting means between said capacitor and said base of said transistor; and
   n. seventh electrical conducting means connecting said second terminal of said sensing means to said gate of said controlled rectifier and to said negative terminal, with said capacitor continuously having an electrical charge built up thereon from said current source through said fourth and sixth electrical conducting means until a voltage is impressed on said base of a first magnitude sufficient to render said transistor conductive whereupon if a voltage of triggering magnitude is impressed on said gate from said sensing means said load is energized by a current flow through said rectifier, transistor and second and third electrical conducting means, with said charge on said capacitor continuing to increase until a voltage is impressed on said emitter of a second magnitude that is greater than the magnitude of the voltage that flows through said unijunction from said second terminal thereof, said unijunction when said voltage of said second magnitude is reached becoming momentarily conductive to allow said capacitor to discharge through said fifth conducting means to the negative terminal, and the discharge of said capacitor lowering the voltage impressed on said base below said first magnitude, with said transistor momentarily becoming non-conductive until said capacitor again becomes charged to the extent that said voltage of said first magnitude is impressed on said base, and said load ceasing to be electrically energized when said resistance of said sensing means increases to the extent that a voltage of triggering magnitude is not impressed on said gate and said voltage on said base is less than said first magnitude.

2. A circuit as defined in claim 1 which further includes:
   o. eighth electrical conducting means including a second resistance element that connects said second terminal of said sensing means to said negative terminal to limit the magnitude that may be impressed on said gate.

3. A circuit as defined in claim 2 in which said second resistance element is a variable resistance.

4. A circuit as defined in claim 1 that further includes:
   o. a second resistance element connected to said second electrical conducting means and the portion of said fourth electrical conducting means between said capacitor and emitter that cooperate with said capacitor to define the pulses of current to which said load is subjected when the resistance of said sensing means is sufficiently low as to permit a voltage of triggering magnitude to be impressed on said gate of said controlled rectifier.

5. A circuit as defined in claim 1 in which said sensing means includes a portion that may be subjected to pressure and a variable resistance element that changes in resistance in proportion to the magnitude of pressure exerted on said portion of said sensing means.

* * * * *